June 24, 1958

M. C. BROWN 2,840,065

HEAT CONTROL FOR AUTOMATIC CHOKE THERMOSTAT

Filed Oct. 19, 1953

INVENTOR.
MORRIS C. BROWN
BY
George R. Ericson
ATTORNEY

INVENTOR.
MORRIS C. BROWN
BY George R. Ericson
ATTORNEY

United States Patent Office 2,840,065
Patented June 24, 1958

2,840,065
HEAT CONTROL FOR AUTOMATIC CHOKE THERMOSTAT

Morris C. Brown, Pontiac, Mich., assignor, by mesne assignments, to ACF Industries, Incorporated, New York, N. Y., a corporation of New Jersey Application October 19, 1953, Serial No. 386,861

20 Claims. (Cl. 123—119)

This invention relates to automatic chokes for automotive carburetors, of the type in which a thermostatic spring urges the unbalanced choke valve closed during cold starting against the opening force of the direct action of suction on the choke and a suction piston connected thereto, as in Coffey Patent No. 2,085,351. The invention consists, more particularly, in novel means for adjusting the application of heat to the thermostat during the warm-up period, and, thus, the rate of relaxing of the thermostat tension and resultant choking effect.

In the mentioned arrangement, warm air is drawn by suction from a stove on the engine exhaust manifold through the thermostat casing and thence leaks past the suction piston into the intake manifold. Provision is made for slight variation of the amount of warm air supplied to the thermostat by variation of the leakage around the suction piston. However, in some cases, the action of the thermostat cannot be properly controlled in this way without adversely affecting action of the suction piston.

Briefly, the present invention contemplates means for controlling the rate of movement of the thermostat by controlling the flow of heated air in a manner to direct different proportions of the total flow over the heat sensitive element without materially affecting the action of the suction piston.

The invention further contemplates a species construction wherein the structure of the baffle element is such as to enable the same first to absorb, and ultimately to dispense, an amount of heat sufficient to provide a prolonged response of the heat sensitive element after the engine has been shut down. The "thermal fly wheel" effect thus engendered provides better correspondence between the cooling of the heat sensitive element and the cooling of the engine mass and thus eliminates unnecessary and deleterious choking in starting a partially warmed up engine.

As is apparent from the above, the general objective of the present invention is to provide better control of the choke valve during the warm-up period.

It is another object of the invention to provide a novel structural arrangement adapted to decrease the rate of actuation of the heat responsive element or thermostat in accordance with a predetermined pattern.

It is another object of the invention to provide novel means for producing a "thermal fly wheel" effect in an automatic choke control whereby the rate of cooling of the thermostat is conformed more closely to the rate of cooling of a stopped engine.

It is another object of the invention to provide a novel arrangement in a carburetor choke construction whereby a carburetor may be adapted to provide enriched fuel mixtures in accordance with different predetermined patterns for different associated engines by substitution of a single inexpensive element.

The foregoing and additional objects and advantages will be apparent from the following detailed description, taken in conjunction with the acompanying drawings in which.

Figure 1:
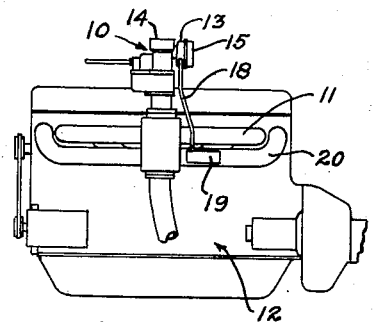
Fig. 1 is a side elevational view, with parts broken away, of an automotive engine and carburetor combination showing the general environment of the present invention.

Referring to the drawings more particularly by means of reference numerals, Fig. 1 illustrates an automotive carburetor 10 incorporating the teachings of the present invention and shown mounted in the usual manner on the intake manifold of an automotive engine 12. The carburetor 10, except for the novel features presently to be described, is of a generally well known type which embodies a thermostatic automatic choke control mounted in a casing 13, adjacent the air inlet portion 14, of the carburetor and having a cover 15 of insulating material secured in position by clips 16 and screws 17. A hot air supply tube 18 conducts hot air from a stove 19 mounted on an exhaust manifold 20 to casing or enclosure 13, 15.

Figure 2:
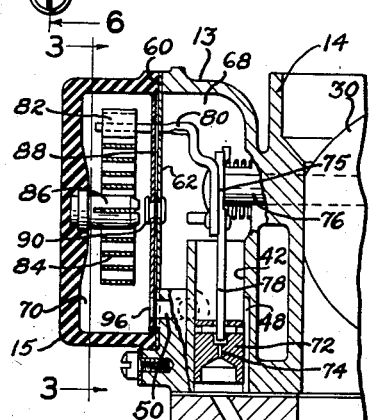
Fig. 2 is an enlarged, fragmentary, composite, sectional elevation of the carburetor of Fig. 1, showing the general relationship between the automatic choke mechanism and other parts of the carburetor.

The sectional view in Fig. 2 depicts the carburetor 10 as comprising upper horn section 14, a central main body section 24, having the usual venturi tubes, as shown, and a lower, throttle body section 26 forming outlet 28. These superimposed sections are formed to define a conventional down-draft mixture conduit, in the horn section of which is pivotally mounted an unbalanced choke valve 30 and in the throttle section of which is disposed a butterfly throttle valve 32.

Inner portion 13 of the casing has a cylinder 42 formed therewithin and the lower end of this cylinder 42 is connected by means of a passage 44 to mixture conduit portion 28, posterior to throttle 32. The wall of the cylinder 42 has a vertical by-pass groove 48 formed in its inner surface and extending upwardly from the lower end of the cylinder a distance which may be somewhat less than the full length of the cylinder, as illustrated in Fig. 2.

Portion 13 of the casing also includes an inlet passage 50 formed in a threaded nipple 52 for attachment of the previously mentioned hot air pipe 18. Passage 50 extends angularly through a boss 56 having an annular end shoulder 58 which projects slightly beyond the plane of the annular outer face 60 of the housing portion 13.

A thin plate-like baffle 62 provided with an opening 64 for accommodation of said shoulder 58, is disposed flush against face 60 and is retained in place by clamped abutment with the rim of the cup-like cover portion 15. Baffle 62 is also provided with an arcuate opening 66, for purposes to appear hereinafter.

It is apparent then that baffle 62 divides the interior of the casing 13, 15 into an inner chamber 68 and an outer chamber 70. It will also be observed that air drawn by suction into the casing from pipe 18 will be released from passage 50 directly into the outer chamber 70. The air thus admitted into the chamber 70, finds its only exit in arcuate opening 66 located a substantial distance from the point of admission and requiring traverse of the air over a substantial distance within the chamber 70. Upon passing through opening 66, the air enters inner chamber 68 from which it may flow down through leakage slot 48 in the wall of cylinder 42, thence through the passage 44 into the induction conduit portion 28 at the point 46.

A piston 72, formed to the conventional shape clearly shown in Fig. 2, is disposed for reciprocation in the choke cylinder 42. It will be noted that the vertical height of the piston 72 is less than that of the by-pass groove 48 so that, with the piston in the position illustrated, with the choke fully open, there is a clear passage for air to flow around it. Additionally, the piston 72 itself is provided with a restrictive axial passage 74 so that, even when the piston is in position to cover the upper end of the groove 48, a flow of hot air may obtain through the casing as above described.

A bell crank assembly 75 is fixed to choke shaft 76 which mounts the choke valve 30. This assembly is pinned at one end to a piston rod 78, pivotally connected to piston 72, and has a finger 80 at its other end projecting through arcuate slot 66 in baffle 62 for actuation by the hooked outer extremity 82 of a coiled, bi-metal thermostat 84. This thermostatic coil 84 has its inner end secured to a post 86 fixed centrally in a casing cover 15.

It may be mentioned at this point that the complete structural arrangement thus far set forth in this detailed description is conventional. As is well known, the position of the choke valve 30 during warm-up is governed, in the first place, by air flow through the mixture conduit past eccentrically mounted choke valve 30, which flow tends to open the valve 30; in the second place, by the opening force applied by the piston 72 as a result of suction from the induction system posterior to the throttle valve 32; and in the third place, by the variable restraining force applied by the heat sensitive coil 84, which latter force is a function of the temperature of the coil. While the first and second forces above mentioned are obviously not constant, depending upon engine load and speed and throttle position, for any given engine and throttle condition the degree of choking is dependent upon the temperature of the heat sensitive coil 84. It is also clear that the aforementioned flow of heated air from the stove 19, which, as described above, if forced to traverse a generally open path through the outer chamber 70, will cause the coil 84 to be heated at a relatively uniform rate almost from the time the engine 12 is started. This results, as previously stated, in a relatively constant rate of reduction of choking action beginning early in the warm-up period.

It is not intended to imply that the conventional arrangement thus far described is inadequate for most automotive installations. On the contrary, it has a record of proved efficiency in combination with certain engines, particularly those of the "straight eight" type having exposed intake manifolds. In other installations, however, such as the "V-type" and those employing jacketed intake manifolds, it has been deemed preferable to provide a somewhat delayed choke response along with a nonuniform increase in rate during the first several minutes of warm-up.

Figure 6:
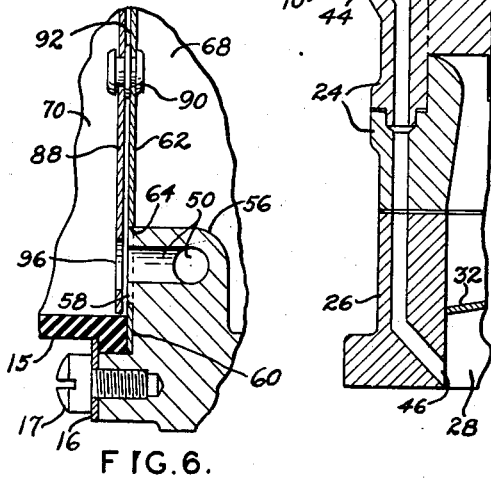
Fig. 6 is a further enlarged, fragmentary, sectional view taken on line 6—6 of Fig. 3 and showing the relation between fixed and movable baffle elements.

Thus, to provide the controlled choke response herein contemplated, a second plate-like baffle 88, circular in form, is disposed in parallel, spaced relation to fixed baffle 62 and pivotally mounted with respect to the latter by means of a rivet 90 having a central spacer collar. This movable baffle 88 is formed from any suitable rigid material and, as clearly shown in Figs. 2 and 6, is disposed just within the cup-like cover 15 with a minimum practical clearance between its peripheral edge and the wall of the cover 15. On the other hand, a definite space 92 is provided between baffles 62 and 88. In one typical installation, for example, the space 92 is of the order of 1/16 inch.

Figure 3:
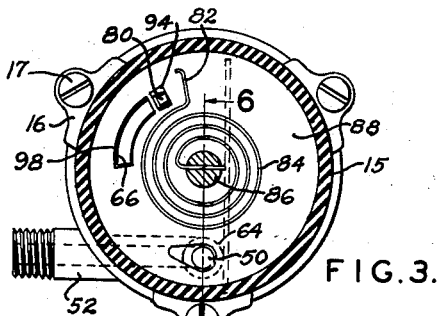
Fig. 3 is a vertical sectional view taken generally along the line 3—3 of Fig. 2, showing the arrangement of parts within the thermostatic chamber, the parts being illustrated in position for a fully opened choke valve.

The baffle 88 is adapted to be moved coordinately with the choke valve 30 for which purpose it is provided with an opening 94 which closely receives laterally extending finger 80 of bell crank assembly 75. In addition, movable baffle 88 is provided with openings 96 and 98 located for respective registration with openings 64 and 66 of stationary baffle 62 when the choke valve is in fully opened position (Fig. 3).

Figure 5:
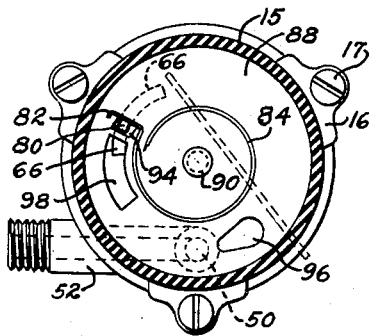
Fig. 5 is a vertical sectional view similar to Fig. 4, the parts being illustrated in position for a partially opened choke valve.

Preferably, but not essentially, the openings 96 and 98 have the shape depicted in the drawings. Thus, the opening 96 is illustrated as being pear shaped, whereby first a minimum and ultimately a maximum open area is disposed opposite the discharge end of the air passage 50 as the choke valve 30 approaches its fully opened position (Figs. 5 and 6). As explained hereinafter, the rate of heating of the thermostat will be controlled in some degree by the shape of the opening 96, and this rate of heating will affect the change in mixture ratio. The invention, however, does not reside in the shape of the opening 96, since the shape will vary according to different engine requirements, and a plurality of holes in a row may serve just as well. The opening 98 is shown as being formed to an arcuate shape corresponding generally to that of arcuate opening 66 in the stationary baffle 62.

Figure 7:
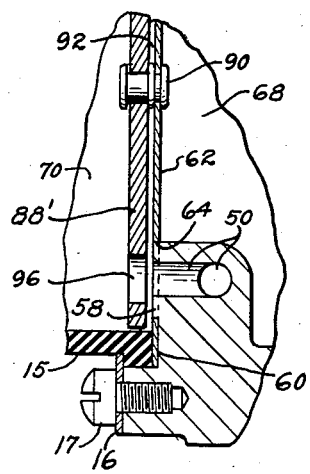
Fig. 7 is a fragmentary sectional view similar to Fig. 6, but showing a modified form of movable baffle adapted to provide a thermal fly wheel effect.

Fig. 7 illustrates a modified form of movable baffle designated by the numeral 88'. While generally similar to the baffle 88, it will be noted that the baffle 88' has a thickness which is substantially in excess of that required for adequate structural rigidity. Furthermore, whereas baffle 88, as previously indicated, may be constructed of any suitable rigid material, baffle 88' is preferably constructed of material having relatively high density, such as metal. Thus constructed, it is obvious that modified baffle 88' has a total mass which is substantially in excess of that of baffle 88. Hence, baffle 88' is adapted to absorb and retain heat in an amount substantially beyond the capacity of the baffle 88. The purpose of this added capacity for heat absorption in the baffle 88' will be made clear hereinafter.

It is recognized, of course, that baffles having a high capacity for heat absorption may take forms other than that of the depicted baffle 88'. It is to be understood, therefore, that any baffle which embodies structure for the specific purpose of providing added capacity for heat absorption is considered to be the patentable equivalent of the disclosed baffle 88'.

In use, the movable baffles 88 and 88' function to modify the automatic choke performance of the above described conventional arrangement. The modified performance is controlled by the movable baffle, which may be either the baffle 88 or the baffle 88'.

Figure 4:
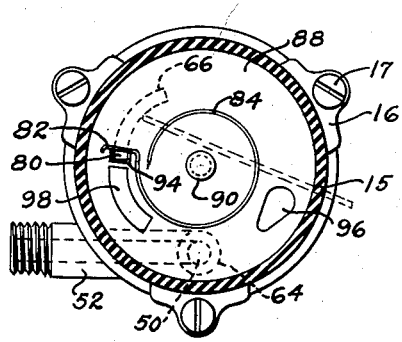
Fig. 4 is a vertical sectional view similar to Fig. 3 showing the parts in position for a closed choke and the thermostat, in part broken away.

Fig. 4 shows the position of parts in the outer chamber 70 under the conditions of a cold start with the choke valve closed. It will be noted that thermostat coil 84, being at a low temperature, has expanded to an extent such that its hook 82 has forced finger 80 to the counterclockwise end of the arcuate slot 66 in the stationary baffle 62, thereby fully closing choke valve 30. At the same time, movable baffle 88 has been rotated so as to dispose a solid portion thereof opposite the discharge end of the air passage 50. It is evident then that heated air flowing from the passage 50, as a consequence of starting the engine, will be discharged into the space 92 between the baffles 62 and 88 which form a by-pass path or duct. A slight amount of this heated air may flow through the openings 96 and 98 and thus pervade the portion of the chamber 70 which encloses the coil 84, but inasmuch as all of the air must eventually pass through the arcuate opening 66, the greater portion will be diverted so as to follow the shorter path provided by the space 92 to the opening 66. Clearly, that portion of the air which flows by this direct path by-passes coil 84 and, hence, has minimum effect thereupon. A continued flow of heated air, however, causes the temperature of the baffle 88 to rise, so that some heat is radiated to the coil 84. This radiated heat, combined with the heat from that portion of the total air flow which does pervade the space around the coil 84, effects a gradual rise in temperature of the coil. As its temperature rises, the coil 84 loses tension to the point where the forces acting to contract it are sufficient to permit gradual and eventually, full opening of the choke valve 30 and also a gradual clockwise rotation of the baffle 88.

It may be seen then that, as baffle 88 approaches a relatively high, stabilized temperature at which it radiates heat at a maximum rate, opening 96 therein is brought closer and closer to a position opposite the discharge end of the passage 50. An intermediate position of the parts is illustrated in Fig. 5 which, of course, corresponds to a partially open position of the choke valve 30.

The movement of opening 96, as above described, enables increasingly large portions of the total air flow to pervade the space around the coil 82. When the narrow end of the opening 96 is brought to a position opposite the passage 50, heated air will be blown directly into the chamber 70, although it will be noted that the leading end of the opening 96 is not as large as the passage 50 and that a portion of the flow will still be diverted into the space 92. Ultimately, the choke valve 30 reaches a full open position, wherein the arm 80 is brought to the upper end of the arcuate slot 66 in the stationary baffle 62. This is the condition illustrated in Fig. 3, from which it will be seen that the wide end of the opening 96 now provides for unrestricted entry of hot air into the space about coil 82. In addition, arcuate openings 66 and 98 have been brought into correspondence, so that practically the whole flow of heated air passes over the thermostat. Continued temperature rise in coil 84 will cause it to retract to the point where its hook 82 disengages from the arm 80.

Figure 8:
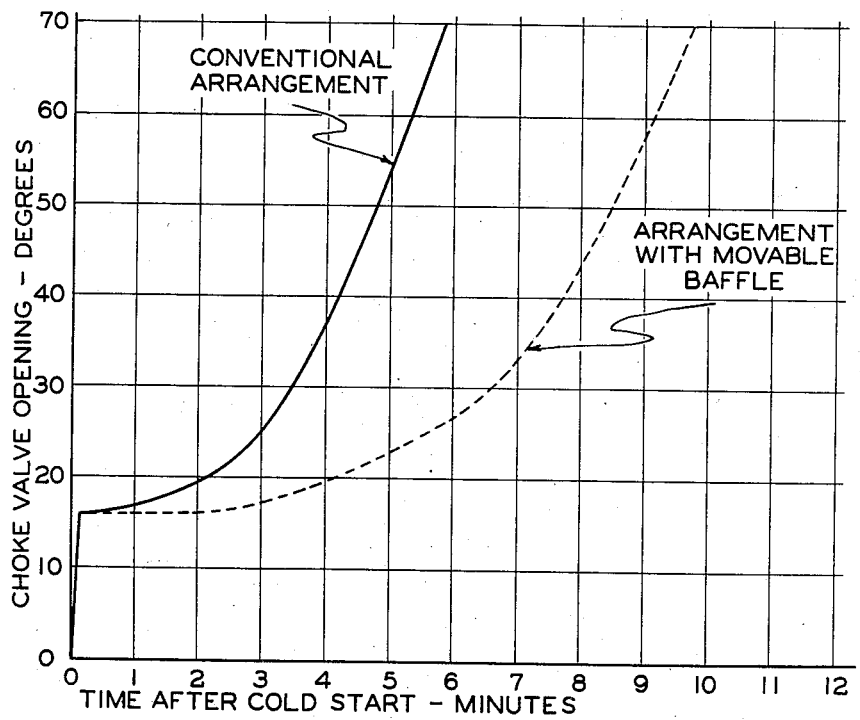
Fig. 8 is a graphical representation of the improved control effected through application of the teachings of the present invention.

Fig. 8 depicts graphically the effect achieved through employment of the novel arrangement herein described. The curves of this figure provide a comparison between test results obtained under identical controlled conditions using the same carburetor, first in conventional arrangement and then with the baffle of the present invention added.

The curves show that the choke valve of each arrangement undergoes an immediate opening movement of about 16 degrees as soon as the engine is started. This is due to the eccentric mounting of the choke valve itself and to the action of the choke piston as previously described. From this point, however, the choke valve of the conventional arrangement begins, with practically no delay, to open farther, obviously due to a temperature rise in its heat sensitive coil. This opening movement proceeds at a rapidly increasing rate until, within less than three and one-half minutes after starting, the valve is opened as much as thirty degrees and has attained its maximum rate of opening. Within six minutes after starting, the choke valve of the conventional arrangement is shown to be fully opened.

The choke valve of the arrangement which includes the movable baffle, on the other hand, is shown to remain at the sixteen degree position, for approximately two minutes, after which it resumes its opening movement at a gradually increasing rate. It does not attain an opening of thirty degrees until some six and one-half minutes after the start, as compared to three and one-half minutes for the conventional arrangement. Beyond the point of thirty degree opening, the arrangement with movable baffle provides a continuing gradual increase in rate and does not attain its maximum rate of opening until the choke valve has been opened to about forty-five degrees, which occurs only after elapse of a full eight minutes since making the cold start. The remaining twenty-five degrees of opening movement is achieved at a substantially constant rate. Almost ten minutes are required for full opening of the choke valve of the improved arrangement.

The above description of the valve action is merely exemplary and offered for this purpose only. Obviously, the time factor will vary between engines of different make, and even different models of the same engine. Furthermore, the above action applies only during near ideal conditions for engine operation during warm-up at near constant light load at near constant speed. Regardless of the engine load and speed, however, the baffle arrangement of this invention can produce a similar displacement between the comparative curves.

It is particularly important to realize that the design of the baffle (size and shape of ports) can materially alter the shape and slope of this curve, which, in turn, modifies the mixture curve. Prior devices could be calibrated only to predetermine the full on and full off conditions for the choke valve. Once heating began, the action was more or less uniform, and the slope of the curve more or less constant, reflecting thermostat characteristics. Note, for example, the upper part of the curve in Fig. 8. On the other hand, with the baffle arrangement, heat applied is controlled according to valve opening, which is a function of thermostat temperature, throttle opening, and engine speed, so that temperature rise of the thermostat is not at a constant rate. (See Fig. 8.) Accordingly, the resistance of the thermostat as a spring need not decrease at a constant rate unless that particular feature is desirable. If the similarity between the action of a choke valve and an air valve type of carburetor is clearly recognized, it will be realized that, like the air valve carburetor, the mixture ratio is controlled by the degree and rate of spring resistance. The air valve type of carburetor was calibrated in one manner according to engine requirement by varying both the degree of resistance and the rate of compression of the spring. Likewise, by controlling the rate of heating of the thermostat, the degree and rate of its spring resistance is controlled, thereby the mixture supplied to the engine may correspond to that actually required by a cold engine as it warms up. Once such a curve has been determined, the desired rate of heating can be likewise determined for the thermostat to provide a suitable corresponding mixture curve.

Attempts have been made to accomplish the same purpose as above described by calibrating either the by-pass passages 48 or providing metering orifices in the passage 44, or both. This expedient was not successful, however, because it varied the amount of force exerted by the piston 72 on the choke valve. Altering the effective pull of the piston 72 obviously affects the mixture ratio delivered by the carburetor and materially affects the calibration to the point where either rough idling or poor part-throttle operation is experienced.

The by-pass system has no effect upon this calibration, and, likewise, it can control the temperature rise independent of any predetermined calibration for the by-passes 48 or induction passages leading thereto.

While the broken line curve of Fig. 8 represents results obtained in the use of a movable baffle conforming to the structural characteristics of the above described baffle 88, it will be understood that the substitution of a baffle 88' for the baffle 88 would provide a generally similar result. Any deviation would appear as a slight displacement of the broken line curve to the right. This would, of course, be due to the greater capacity for heat absorption in the baffle 88' and the consequent delay in temperature rise therein as compared to the baffle 88. Varying the positioning and shape of opening 96, as by replacing rotary disc baffle 88, will provide substantial adjustability of choking action such as cannot be obtained by merely changing thermostats which must respond uniformly for each degree of temperature change. Moreover, this adjustment is brought about without appreciably affecting the action of suction piston 72.

The primary purpose of the increased heat absorbing capacity in the baffle 88', is, however, to provide a heat reservoir of substantial capacity within the chamber 70 so as to prolong the choking action in an installation that has for any reason been shut down during the warm-up period. This avoids the not uncommon experience wherein an automobile, for example, started in cold weather, driven for only a few blocks, and then shut down, is found to be over-choked when, after the elapse of only a few minutes, an attempt is made to start it again. Such over-choking is attributable to the fact that the heat sensitive element has been only superficially warmed and, being normally in a relatively exposed position above the engine, cools off relatively rapidly. The engine, on the other hand, having sufficient mass to retain most of the heat that has been generated during the short run, does not require full choking in order to be restarted. The net result is over-choking and possible flooding. It is apparent then that by providing a heat reservoir in the chamber 70, the cooling of the heat sensitive coil 82 may be retarded. The added capacity for initial absorption and ultimate prolonged dissipation of heat in the baffle 88' thus provides a "thermal fly wheel" effect which overcomes the annoying situation above outlined.

Clearly, there has been provided a method, along with a structural arrangement and a modification thereof, which together fulfill the objects and advantages sought therefor.

It is to be understood that the foregoing description and the accompanying drawings have been given only by way of illustration and example, and that changes in form and substitution of equivalent elements or steps which will be apparent to those skilled in the pertinent art are contemplated as within the scope of the present invention, which is limited only by the claims which follow.

What is claimed is:

1. In an automotive carburetor, a choke valve, a thermostat coacting with said valve to influence mixture ratio by a choking operation, means for directing a flow of heated fluid over said thermostat, movable means for controlling the heating effect of said flow on said thermostat, and means interconnecting said movable means with said thermostat, whereby the rate of temperature rise of said thermostat may be influenced by the temperature response of said thermostat.

2. In an automotive carburetor, a choke valve, a thermostat coacting with said valve to influence mixture ratio by a choking operation, a casting for said thermostat, inlet means for introducing a heated fluid into said casing, outlet means for discharging said fluid from said casing, movable means for varying the path of flow of said fluid with respect to said thermostat to vary the rate of temperature rise in said thermostat, and means interconnecting said movable means with said thermostat, whereby varying rates of thermostat response are obtained without changing either temperature or volume of said flow.

3. In an automotive carburetor, a choke valve, a thermostat coacting with said valve to provide a choking operation, a casing for said thermostat, said casing including a wall having spaced openings therein, one for admission of heated fluid into said casing, and another for emission of said fluid from said casing, and movable baffle means disposed interiorly of said casing for selectively diverting a major portion of the fluid flow from said one opening directly to said other opening and thereby limiting the fluid flow over said thermostat.

4. In an automotive carburetor, a choke valve, a thermostat coacting with said valve to provide choking operation, an enclosure for said thermostat, said enclosure including a wall having spaced openings therein, one for admission of heated fluid into said enclosure and another for emission of said fluid from said enclosure, a plate-like baffle movably disposed interiorly of said enclosure and interposed between said thermostat and said wall, said baffle being provided with openings located for respective correspondence with the openings in said wall, and means influenced by said thermostat for moving said baffle in accordance with temperature changes in said thermostat.

5. In an automotive carburetor having a heat sensitive element adapted to influence a choking operation, the combination of a cylindrical enclosure for the heat sensitive element, said cylindrical enclosure including a planar end wall having an inlet opening and an outlet opening therein, said openings being predeterminately spaced apart, means including a fluid passage for admitting a fluid flow into said enclosure through said inlet opening for subsequent emission from said enclosure through said outlet opening, movable baffle means supported in parallel spaced relation with said end wall, said baffle means comprising a plate-like member supported for pivotal movement and having an opening therethrough, said latter opening being located for selective alignment with said inlet opening aforementioned, and means influenced by said heat sensitive element for moving said baffle in accordance with temperature changes in said sensitive element.

6. In an automotive carburetor having a heat sensitive element adapted to influence a choking operation, the combination of a cylindrical enclosure for said heat sensitive element, said cylindrical enclosure including a planar end wall having an inlet opening and an outlet opening therein, said openings being predeterminately spaced apart, means including a fluid passage for admitting a fluid flow into said enclosure through said inlet opening for subsequent emission from said enclosure through said outlet opening, movable baffle means supported in parallel spaced relation with said end wall, said baffle means comprising a circular plate-like member supported at its center for pivotal movement and having a peripheral edge adjacent the cylindrical inner surface of said enclosure, said member being provided with a first and a second opening therethrough, said latter openings being located for selective simultaneous alignment with said inlet and outlet openings respectively, and means influenced by said heat sensitive element for moving said baffle in accordance with temperature changes in said element.

7. In an automotive carburetor having a heat sensitive element adapted to influence a choking operation, the combination of a cylindrical enclosure for the heat sensitive element, said cylindrical enclosure including a planar end wall having an inlet opening and an outlet opening therein, said openings being predeterminately spaced apart, means including a fluid passage for admitting a fluid flow into said enclosure through said inlet opening for subsequent emission from said enclosure through said outlet opening, movable baffle means supported in parallel spaced relation with said end wall, said baffle means comprising a circular plate-like member supported at its center for pivotal movement and having a peripheral edge adjacent the cylindrical inner surface of said enclosure, said member being provided with a first and a second opening therethrough, said first opening being shaped to provide a leading portion having an open area smaller than the cross sectional area of said fluid passage and a trailing portion having an open area larger than the cross sectional area of said fluid passage, said first and second openings being located for selective simultaneous partial alignment of said second opening with said outlet opening and alignment of said leading portion with said passage and for selective simultaneous alignment of said second opening with said outlet opening and alignment of said trailing portion with said passage, and means influenced by the heat sensitive element for moving said baffle in accordance with temperature changes in the heat sensitive element.

8. In a carburetor having an automatic choke mechanism adapted to effect changes in mixture ratio by means actuated in response to variations in engine temperature and suction anterior and posterior the throttle, the combination in said mechanism of a thermostat, a casing for said thermostat, inlet means for introducing a heated fluid into said casing, a control for said inlet means operated in response to variations in suction anterior the throttle, an outlet means for discharging said fluid from said casing, and a control for said outlet means actuated in response to suction posterior the throttle.

9. In a carburetor having an automatic choke mechanism adapted to effect changes in mixture ratio by means actuated in response to variations in engine temperature and in engine suction anterior and posterior the throttle, the combination in said mechanism of thermostatic means, a casing for said thermostatic means, inlet means for introducing a heated fluid into said casing, a control for said inlet means actuated in response to the effect of temperature on said temperature responsive means, outlet means for discharging said fluid from said casing, and a control for said outlet means actuated in response to the effect of suction on said suction responsive means.

10. In a carburetor, an automatic choke mechanism including a choke valve, independently operable means actuated in response to temperature and suction to operate said valve to effect changes in mixture ratio, a casing for said temperature actuated means, inlet means introducing a heated fluid into said casing, a fluid control means for said inlet means actuated in response to the effect of temperature and valve position, outlet means for discharging said fluid from said casing, and a fluid control means for said outlet means actuated in response to the effect of suction on said suction responsive means.

11. In a carburetor having an automatic choke mechanism adapted to effect changes in mixture ratio by a choke valve actuated in response to variations in engine temperature and suction, the combination in said mechanism of a thermostat, a casing for said thermostat, inlet means for introducing a heated fluid into said casing, a control for said inlet means actuated in response to the movement of said choke valve, outlet means for discharging said fluid from said casing, and a control for said outlet means actuated in response to changes in suction.

12. The method of operating a carburetor equipped with an automatic choke controlled by engine temperature and suction to obtain varying amounts of change in the mixture ratio with like increases and decreases in temperature throughout the range of engine operating temperatures from start to normal, comprising the step of varying the rate of heating of said thermostat by applying heat thereto according to the degree of thermostat response.

13. The method of operating a carburetor equipped with an automatic choke controlled by temperature and suction to obtain varying amounts of change in the mixture ratio with like increases and decreases in temperature throughout the range of engine operating temperatures from start to normal, comprising the step of varying the rate of heating of said thermostat by directing heated fluid from a suitable engine source indirectly to and directly to said thermostat according to the degree of thermostat response.

14. The method of operating a carburetor equipped with an automatic choke controlled by temperature and suction to obtain varying amounts of change in the mixture ratio with like increases and decreases in temperature throughout the range of engine operating temperatures from start to normal, comprising the step of varying the rate of heating of said thermostat by directing heated fluid from a suitable engine source indirectly to and directly to said thermostat according to the amount of suction acting upon said automatic choke.

15. The method of operating a carburetor equipped with an automatic choke controlled by temperature and suction to obtain varying amounts of change in the mixture ratio with like increases and decreases in temperature throughout the range of engine operating temperatures from start to normal, comprising the step of varying the rate of heating of said thermostat by directing heated fluid from a suitable engine source indirectly to and directly to said thermostat according to the position of said automatic choke valve.

16. An automatic choke control for a carburetor, comprising a casing, a thermostat therein, inlet and outlet ports in said casing, means to heat said thermostat including means to direct a heated fluid through an inlet port, said casing, and said outlet port for controlling the temperature of said thermostat, there being direct and by-pass paths between said ports for directing said fluid, respectively, in close association with said thermostat for maximum heating effect thereon, and around said thermostat for modified effect thereon, and a device controlling communication between said inlet port and said paths and operatively connected to said thermostat for adjusting the effectiveness of said heating means on said thermostat.

17. In a carburetor including an induction tube, an automatic choke mechanism for said carburetor including a choke valve in said induction tube, bimetallic temperature actuated means normally urging said valve towards closed position, suction operated means opposing the action of said temperature actuated means and normally urging the choke valve towards open position, a casing for said temperature actuated means, inlet means for introducing heated air into said casing from a suitable source, an outlet for said casing, and an element movable in response to movement of the choke valve for diverting at least a portion of the flow of heated air from contact with the temperature actuated means.

18. In a carburetor, a body having a mixture conduit therethrough, a choke valve for controlling flow through said conduit, a throttle valve in said mixture conduit, an automatic choke mechanism for said carburetor including a casing, a partition in said casing defining a pair of chambers, a bi-metallic thermostat arranged in one of said chambers and operative for normally urging the choke valve toward closed position at low engine temperatures, a suction motor in the other chamber for urging said choke valve in an opening direction against the action of the thermostat, a source of heated air opening into the thermostat chamber, movable means for deflecting said heated air away from said thermostat and for by-passing the deflected air to the suction motor chamber for maintaining normal air conditions in said chamber, and an operative connection between said thermostat and said movable means.

19. In a carburetor, a body having a mixture conduit therethrough, an automatic choke mechanism for said carburetor including a choke valve for controlling the flow through said conduit, a throttle valve in said mixture conduit, a source of heated air, a passageway having an inlet connected to said source and an outlet in said mixture conduit posterior of said throttle, said passageway containing a bimetallic thermostatic means normally urging the choke valve toward closed position at low engine temperatures, a suction motor having a connection with said valve for urging said valve in an opening direction against the action of said thermostatic means and powered by the pressure difference between the inlet and outlet of said passageway, movable flow deflector means for varying the path of flow of said fluid from said source away from said thermostatic means to change the rate of temperature rise in said thermostatic means, and an operating connection between said movable means and said thermostatic means, whereby varying rates of thermostatic response are obtained without changing either the temperature of the air flowing through said passage or modifying the opening force on the valve by said suction motor.

20. An automatic choke control for an internal combustion engine carburetor comprising a casing, a thermostat therein, a suction responsive device communicating with said casing, a source of heating fluid, means for operatively connecting said thermostat and said suction device to the choke valve, a plurality of inlet ducts through said casing communicating, at least in part, with said source for directing heating fluid through said casing and maintaining substantially atmospheric pressure therein, suction porting in the wall of said casing and said suction device for applying operating pressure differentials to said suction device and to said inlet ducts for causing flow of fluid through said ducts into said casing, and means operatively connected to said thermostat and movably associated with said inlet ducts for variably influencing the flow of said fluid therethrough so as to vary the rate of heating of said thermostat, said ducts in all positions of said means, supplying sufficient fluid to said casing so that the pressure differentials applied to said suction responsive device are substantially independent of said means.

References Cited in the file of this patent

UNITED STATES PATENTS

| | | |
|---|---|---|
| 1,382,498 | Giesler | June 21, 1921 |
| 2,010,305 | Latimer | Aug. 6, 1935 |
| 2,030,331 | Smith | Feb. 11, 1936 |
| 2,101,338 | Lovekin | Dec. 7, 1937 |
| 2,309,295 | Barnes | Jan. 26, 1943 |
| 2,385,096 | McCollum | Sept. 18, 1945 |